United States Patent
Matsumoto et al.

(10) Patent No.: US 6,320,829 B1
(45) Date of Patent: Nov. 20, 2001

(54) DIGITAL COPY CONTROL METHOD, DIGITAL RECORDING MEDIUM, DIGITAL RECORDING MEDIUM PRODUCING APPARATUS, DIGITAL REPRODUCING APPARATUS AND DIGITAL RECORDING APPARATUS

(75) Inventors: Seiji Matsumoto; Masamichi Furukawa, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/318,487

(22) Filed: May 25, 1999

(30) Foreign Application Priority Data

May 26, 1998 (JP) ................................. 10-161361
Jul. 7, 1998 (JP) ................................. 10-192084

(51) Int. Cl.[7] ........................................ G11B 5/09
(52) U.S. Cl. ...................... 369/47.12; 369/53.21; 369/275.3
(58) Field of Search .................. 369/47.1, 47.12, 369/47.14, 47.15, 47.55, 53.11, 53.2, 53.21, 53.31, 53.35, 53.36, 53.37, 53.41, 53.44, 53.45, 84, 124.07, 275.3

(56) References Cited

U.S. PATENT DOCUMENTS 5,453,968 * 9/1995 Veldhuis et al. ............ 369/47.12 X
6,031,815 * 2/2000 Heemskerk .
6,209,092 * 3/2001 Linnartz .

* cited by examiner

*Primary Examiner*—Paul W. Huber
(74) *Attorney, Agent, or Firm*—Pillsbury Winthrop LLP

(57) ABSTRACT

Copying of digital data from a digital recording medium is controlled so as to prevent unauthorized copying. The digital data is transmitted from a transmitter-side apparatus to a receiver-side apparatus through interfaces thereof in a system of a plurality of digital apparatuses connected to each other through a bus and mutually authenticated. The interfaces permit transmission and receiving of the digital data only between the authenticated apparatuses. Copy control information indicating a copy restriction level is added to main data of the digital data recorded on the digital recording medium such that the main data contains a first portion containing at least one of picture information and voice information, and a second portion containing the copy control information. Electronic watermark information is added to the second portion of the main data. An error correction code is added to the main data, and then intentional error information having a particular pattern is added to the digital data. The reproducing and recording operations of the transmitter-side apparatus and the receiver-side apparatus are restricted with respect to the digital data in the digital recording medium, depending upon whether the digital recording medium is authorized one or not, which is determined based on the copy control information, the electronic watermark, and the error information.

17 Claims, 4 Drawing Sheets

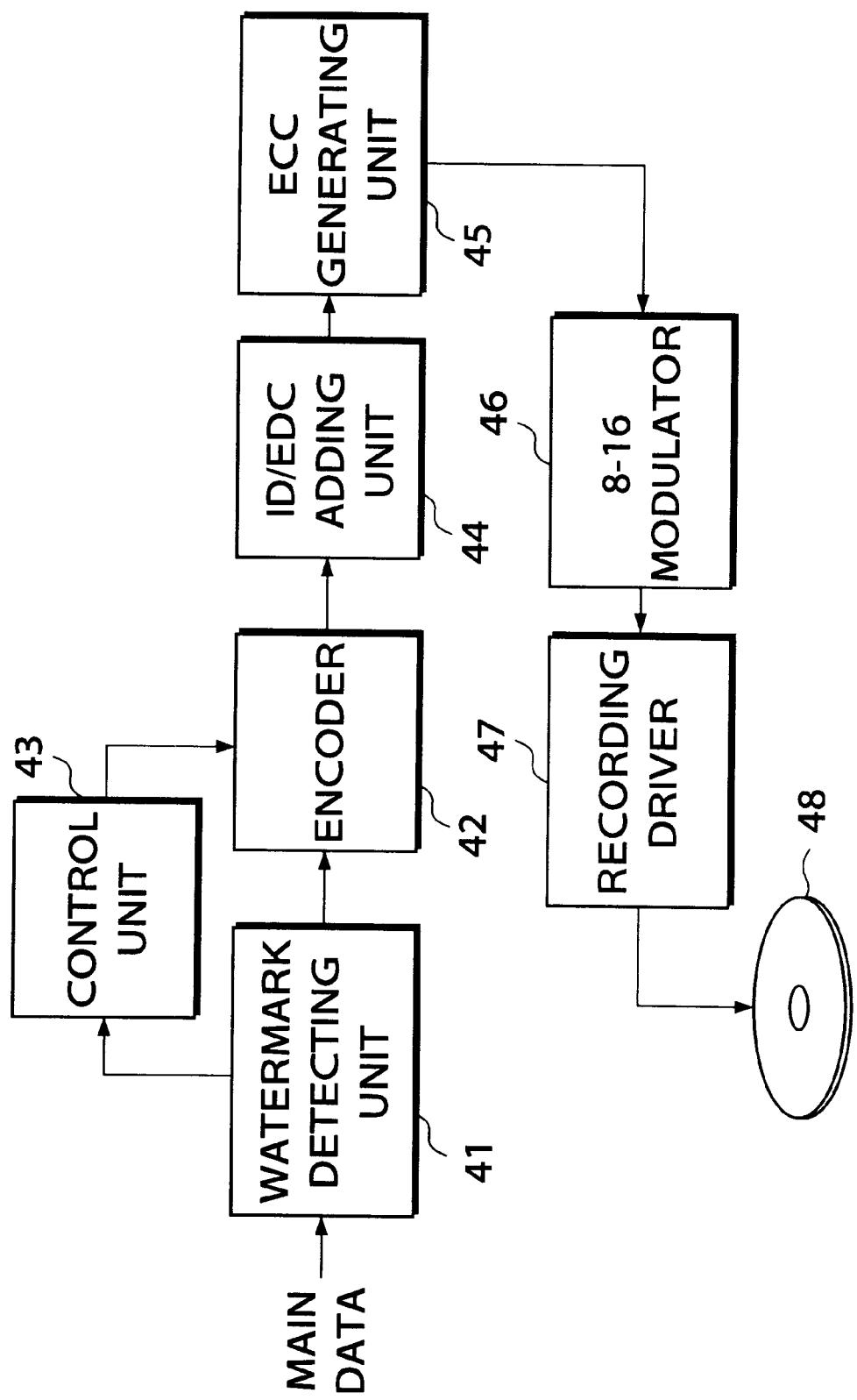

DIGITAL COPY CONTROL METHOD, DIGITAL RECORDING MEDIUM, DIGITAL RECORDING MEDIUM PRODUCING APPARATUS, DIGITAL REPRODUCING APPARATUS AND DIGITAL RECORDING APPARATUS

BACKGROUND OF THE INVENTION

1. Field of the Invention

The present invention relates to a digital copy control technique employed in a system in which digital apparatuses, such as DVD (digital video disc) recording/reproduction apparatuses, digital VCR, and digital TV, are connected to each other via interfaces having the function of mutual authentication. In particular, this invention is concerned with such a digital copy control technique that effectively prevents unauthorized copying that is not intended by a creator or producer of data, while limitedly permitting digital copying of the data.

2. Prior Art

In a conventional digital data transmission system, digital recording/reproduction apparatuses, such as optical disc (e.g., DVD) reproduction apparatus, digital TV, digital VCR, and others, are connected to each other via an IEEE-1394 bus that serves as an intelligent interface, so that data contents, such as pictures and music, are transmitted and received between these digital apparatuses. When digital data is transmitted and received between these apparatuses, the system checks if each of the apparatuses operates in a manner as intended by the creator or producer who created the contents of the data, and, if any apparatus does not operate as intended by the creator, data transfer is prohibited, to thereby prevent the user from illegally copying the picture and/or music contents against the intention of the creator.

Digital main data to be transmitted contains copy control information called "CCI". The CCI consists of two bits, namely, "00", "10" or "11", where "00" indicates permission of free copying, "10" indicates permission of one-time copying, and "11" indicates prohibition of copying.

Upon transmission of digital data, the transmitter-side apparatus initially checks the CCI to determine its copy restriction level for the contents of the digital data, and also checks, on the IEEE-1394 bus, whether the receiver-side apparatus operates in a manner as intended by the content creator. If complete authentication is established between the receiver-side apparatus and the transmitter-side apparatus, the contents is encrypted and transmitted from the transmitter-side apparatus. In this case, where the CCI information of the digital data transmitted from the transmitter-side apparatus is, for example, "10", and the receiver-side apparatus is a sound recording apparatus, the CCI is rewritten into "11" and thus recorded during copying of the digital data. As a result, second and subsequent copying actions are prohibited, and thus only one-generation copying is realized.

As another method for preventing unauthorized copying by digital picture apparatuses, it has been proposed to use electronic watermark information (generally called "watermark"). In this method, watermark information may be directly added to a non-obvious or low-intensity portion of the waveform of a picture signal, or may be embedded into a particular frequency component of frequency conversion information of the original signal. By providing the watermark with information on permission/prohibition of copying, the watermark is able to indicate whether free copying is permitted, or only reproduction of the data is permitted, for example.

In the conventional copy control method using CCI as described above, however, when the receiver-side apparatus rewrites the CCI from "10" (indicating permission of one-time copying) into "11" (indicating prohibition of copying), for example, it is relatively easy to rewrite "10" into "00" (indicating permission of free copying) through two-bit manipulation, thus causing a problem that unauthorized copying may be done without difficulty.

In the method using watermarks, on the other hand, watermark information is distributed over a relatively wide range of main data containing picture and/or voice information, and it is therefore difficult for the receiver-side apparatus to rewrite this information. If the watermark information is to be rewritten on the user level, the receiver-side apparatus must be equipped with a considerably large circuit. This is advantageous over the use of CCI in terms of prevention of unauthorized or illegal copying. However, since the watermark cannot be easily rewritten as described above, it is rather difficult to permit only one-time copying by rewriting or changing the flag (i.e., watermark) as in the case where CCI is used.

SUMMARY OF THE INVENTION

It is therefore an object of the invention to prevent unauthorized digital copying more effectively, while allowing the use of different forms or levels of copy restriction.

To attain the above object, the present invention provides a digital copy control method of controlling copying of digital data from a digital recording medium, which digital data is transmitted from a transmitter-side apparatus to a receiver-side apparatus through interfaces thereof in a system of a plurality of digital apparatuses that are connected to each other through a bus and mutually authenticated, the interfaces permitting transmission and receiving of the digital data only between the authenticated apparatuses, the digital copying control method restricting reproducing and recording operations of the transmitter-side apparatus and the receiver-side apparatus based on copy control information contained in the digital data for restricting copying of the data so as to prevent unauthorized copying, comprising the steps of adding the copy control information indicating a copy restriction level, to main of data of the digital data recorded on the digital recording medium such that the main data contains a first portion containing at least one of picture information and voice information, and a second portion containing the copy control information, adding electronic watermark information to the second portion of the main data containing the at least one of picture information and voice information, adding an error correction code to the main data, and then adding intentional error information having a particular pattern to the digital data, determining whether the digital recording medium from which the digital data is to be reproduced and transmitted from the transmitter-side apparatus is authorized one or not, based on the copy control information, the electronic watermark, and the error information having the particular pattern, and restricting the reproducing and recording operations of the transmitter-side apparatus and the receiver-side apparatus with respect to the digital data in the digital recording medium, depending upon whether the digital recording medium is authorized one or not.

To attain the above object, the present invention provides a digital recording medium in which digital data including main data is recorded for reproduction or recording on another recording medium, wherein the main data includes a first portion comprising at least one of picture and voice information, and a second portion comprising copy control information indicating a copy restriction level, the copy control information being rewritten upon digital copying of the main data so that the copy restriction level is raised to a higher level, the main data further including electronic watermark information that is added to the first portion of the main data comprising the at least one of picture and voice information, the electronic watermark information being unable to be rewritten upon digital copying of the main data, wherein a medium mark is added to a portion of the digital data in which the main data is not recorded, such that the medium mark is not read by an external device, and wherein reproduction and digital copying of the main data are controlled in accordance with an intention of a producer of the main data, based on a combination of contents of the copy control information, electronic watermark information, and the medium mark.

To attain the above object, the present invention provides an apparatus for producing a digital recording medium, comprising a watermark information adding device that adds electronic watermark information to original data so as not to affect characteristics of the original data, a copy control information adding device that adds copy control information to the original data, the copy control information being provided for restricting digital copying of the original data, an error correction code generating device that generates an error correction code based on main data of the original data to which the electronic watermark information and the copy control information have been added, and adding the error correction code to the original data, and an error information adding device that adds error information having a particular pattern, as medium mark, to the original data to which the error correction code has been added by the error correction code generating apparatus.

To attain the above object, the present invention further provides a digital reproduction apparatus usable as a transmitter-side apparatus in a system comprising a plurality of digital apparatuses that are connected to each other via a bus and mutually authenticated, the system being constructed to transmit digital data from the transmitter-side apparatus of the digital apparatuses to a receiver-side apparatus thereof through respective interfaces that permit transmission and receiving of the digital data between the authenticated apparatuses, comprising a reading device that reads out recorded data from a digital recording medium, an error detecting/correcting device that extracts an error correction code from the recorded data read by the reading device, and detects and corrects an error in the recorded data read out by the reading device, based on the extracted error correction code, a particular pattern error detecting device that detects whether the error detected by the error detecting/correcting device has a particular pattern or not, an output device that generates the recorded data whose error has been corrected by the error detecting/correcting device, in a form of digital information that matches specifications of the interfaces, a copy control information judging device that extracts and makes a judgment on copy control information contained in the recorded data whose error has been corrected, the copy control information being provided for restricting digital copying of the data, an electronic watermark information judging device that extracts electronic watermark information indicating a copy restriction level, from the recorded data whose error has been corrected, and makes a judgment on the electronic watermark information, and an output control device that determines whether the digital recording medium is an original medium or a copy medium, based on a result of detection of the particular pattern error detecting device, and permits or prohibits reproduction of the recorded data by the digital reproduction apparatus as the transmitter-side apparatus, based on a result of determination by the output control device and results of judgments made by the copy control information judging device and the electronic watermark information judging device.

Preferably, in the digital reproduction apparatus, the copy control information judging device determines one of three copy restriction levels from the copy control information, the three copy restriction levels indicating permission of free copying, permission of one-generation copying, and prohibition of copying, respectively, wherein the electronic watermark information judgment device determines one of two copy restriction levels from the electronic watermark information, the two copy restriction levels indicating permission of free copying and prohibition of copying, and wherein the output control device determines whether the digital recording medium contains data that was recorded with permission, based on results of determinations of the copy control information judging device and the electronic watermark information judging device, and a result of detection of the particular pattern error detecting device, and allows the digital reproduction apparatus to reproduce the data recorded in the digital recording medium if the data was recorded in the medium with permission.

For example, the output control device allows the digital reproduction apparatus to reproduce the data recorded in the digital recording medium, if the error having a particular pattern is detected by the particular pattern error detecting device, and the copy restriction level determined by the copy control information judging device indicates permission of one-generation copying, while at the same time the copy restriction level determined by the electronic water information judging device indicates prohibition of copying On the other hand, the output control device inhibits the digital reproduction apparatus from reproducing the data recorded in the digital recording medium, if the error having a particular pattern is detected by the particular pattern error detecting device, and contradictory results are obtained from the copy control information judging device and the electronic watermark information judging device except the case where the copy restriction level determined by the copy control information judging device indicates permission of one-generation copying, and the copy restriction level determined by the electronic watermark information judging device indicates prohibition of copying.

Also, the output control device inhibits the digital reproduction apparatus from reproducing the data recorded in the digital recording medium, if the error having a particular pattern is detected by the particular pattern error detecting device, and no electronic watermark information is detected by the electronic watermark judging device.

Further, the output control device inhibits the digital reproduction apparatus from reproducing the data recorded in the digital recording medium, if no error having a particular pattern is detected by the particular pattern error detecting device, and a result of determination of the copy control information judging device is different from a result of determination of the electronic watermark information judging device.

To attain the above object, the present invention further provides a digital recording apparatus usable as a receiver-side apparatus in a system comprising a plurality of digital apparatuses that are connected to each other via a bus and mutually authenticated, the system being constructed to transmit digital data from a transmitter-side apparatus of the digital apparatuses to the receiver-side apparatus through respective interfaces that permit transmission and receiving of the digital data between the authenticated apparatuses, comprising a receiving device that receives digital data that includes a first portion comprising at least one of picture and voice information, and a second portion comprising copy control information having one of copy restriction levels indicating permission of free copying, permission of one-generation copying and prohibition of copying, the digital data further including electronic watermark information that is added to the first portion of the digital data comprising the at least one of picture and voice information, and a recording control device that determines the copy restriction levels of the copy control information and electronic watermark information of the digital data, and controls the digital recording apparatus such that wherein, when the determined copy restriction level of the copy control information indicates permission of one-generation copying and the determined copy restriction level of the electronic watermark information indicates prohibition of copying, the digital recording apparatus records the electronic watermark information as it is, and records the copy control information with the copy restriction level thereof being rewritten into one indicating prohibition of copying.

Preferably, in the digital copy control method according to the present invention, the authenticated digital apparatuses include at least one apparatus that is constructed to be able to output contents of digital data recorded on the digital recording medium, as an analog signal, without passing through the interfaces, and at least one apparatus that is constructed to be able to record the contents of digital data received as the analog signal, into a new digital recording medium, without passing through the interfaces, all of the authenticated digital apparatuses being constructed such that when data contents supplied in a form of an analog signal or a digital signal is digitally recorded onto the digital recording medium, electronic authentication signature data that can be recognized only between the authenticated apparatuses are recorded in addition to the data contents, onto the digital recording medium, the method further comprising the steps of detecting presence of the electronic authentication signature data that can be recognized only between the authenticated digital apparatuses, when reproducing the contents of digital data recorded in the digital recording medium, and permitting reproduction of the contents of digital data in the digital recording medium only when the electronic authentication signature data is present.

Preferably, the digital recording medium according to the present invention has further recorded thereon electronic authentication signature data that can be recognized only between the authenticated digital apparatuses.

Preferably, the digital reproducing apparatus according to the present invention further comprises a detecting device that detects electronic authentication signature data that can be recognized only between the authenticated digital apparatuses, and wherein the output control device inhibits the digital reproducing apparatus from reproducing the recorded data when the electronic authentication signature data is not detected by the detecting device.

Preferably, in the digital recording apparatus according to the present invention, the authenticated digital apparatuses include at least one apparatus that is constructed to be able to output contents of digital data recorded on the digital recording medium, as an analog signal, without passing through the interfaces, and wherein the recording control device records electronic authentication signature data that can be recognized only between the authenticated digital apparatuses, in addition to the contents of digital data, onto the digital recording medium, when digitally recording the contents of digital data supplied in a form of the analog signal, onto the digital recording medium.

According to the present invention, the legality or validity of the digital recording medium is judged based on three types of information. The first information is copy control information indicating a copy restriction level and contained in a portion of the main data other than picture and/or voice information. Where digital copying is to be restricted, the copy restriction level of the copy control information is raised to a higher level during copying of the main data. The second information is electronic watermark information similarly indicating a copy restriction level and contained in a portion of the main data including picture and/or voice information. The electronic watermark information cannot be rewritten during digital copying, and it is extremely difficult to rewrite this type of information. The third information is error information (hereinafter called "media mark") having a particular pattern and deliberately added to data on which error correction has been performed. Since this type of information is added to a portion of the recording medium that does not contain main data, it is not contained in the main data reproduced from the recording medium, and disappears upon digital copying.

Since the three types of information have different properties as described above, it can be determined in detail whether a digital recording medium contains data that was properly copied, that is, copied with permission or authorization, depending upon the contents of these three types of information. Namely, the media mark, which disappears upon one-time digital copying, makes it possible to determine whether the digital recording medium under consideration is an original medium or a copy medium, based on the presence of the media mark. While both of the copy control information and electronic watermark information indicate copy restriction levels, only the combination of the copy control information and electronic watermark information both indicating permission of free copying is valid in the case of a recording medium for which digital copying is freely permitted. In other combinations, such a medium on which a media mark cannot be detected may be recognized as an unauthorized or unjustified medium, since there is a possibility that the copy control information was rewritten without following an appropriate procedure. Where copying is permitted under certain restrictions, both the copy control information and electronic watermark information should indicate copy restriction levels, and, if one of the copy restriction levels of these types of information indicates permission of free copying, the medium will be regarded as an unauthorized or unjustified medium. Where both of the copy control information and electronic watermark information provide a certain copy restriction level, only the copy restriction level of the copy control information is rewritten upon copying. At this time, even if the copy control information is deliberately rewritten so that its copy restriction level is lowered or kept at the current level, the inappropriate rewriting is recognized due to disappearance of the media mark, and the medium under consideration can be determined as unauthorized or unjustified one.

Where the digital recording medium is judged as unauthorized or unjustified one on the side of the transmitter-side apparatus, this apparatus inhibits reproduction of digital data, and therefore data recorded on the medium cannot be reproduced nor recorded in another medium, whereby unauthorized copying can be effectively prevented. Where the digital recording medium is judged as authorized or justified one on the side of the transmitter-side apparatus, this apparatus transmits the digital data to the authenticated receiver-side apparatus such that recording and reproduction or only reproduction of the data is made possible depending upon the copy restriction levels, thus enabling digital copying under restricting conditions.

In the case where digital recording can be performed with respect to data transmitted via an analog signal between authenticated apparatuses, electronic authentication signature data that can be recognized only between the authenticated apparatuses is recorded along with the contents of digital data, and reproduction of the data contents is permitted only when authentication based on the electronic signature is established, in addition to the above described recognizing methods. In this manner, unauthorized copying of the data contents itself can be more surely prevented.

The above and other objects, features, and advantages of the invention will become more apparent from the following detailed description taken in conjunction with the accompanying drawings.

BRIEF DESCRIPTION OF THE DRAWINGS

FIG. 4 is a block diagram showing in detail the construction of a recorder of the system of FIG. 1.

DETAILED DESCRIPTION OF THE PREFERRED EMBODIMENT

The present invention will be described in detail with reference to the accompanying drawings showing a preferred embodiment of the invention.

Figure 1:
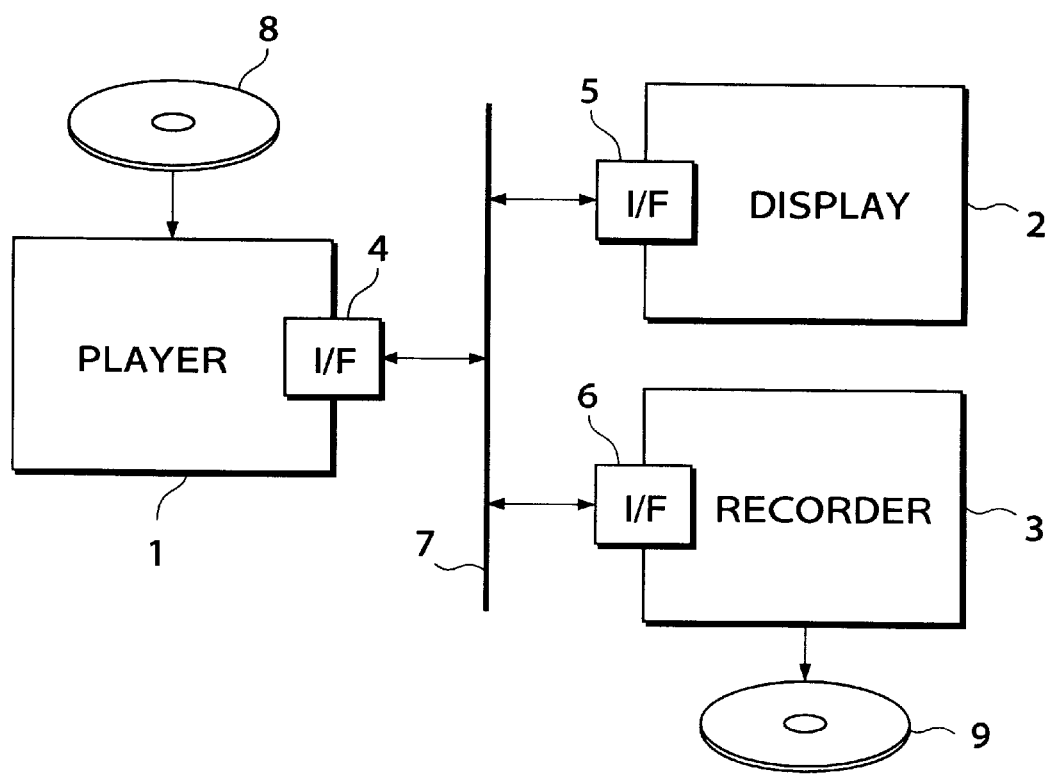
FIG. 1 is a block diagram showing the construction of a digital data transmission system according to one embodiment of the present invention.

FIG. 1 shows the construction of a digital data transmitter/receiver system according to one embodiment of the present invention.

In the system shown in FIG. 1, a transmitter-side apparatus comprising a DVD player 1 and a receiver-side apparatus comprising a display 2 and a DVD recorder 3 are connected to each other through respective interfaces 4, 5, 6 and bus 7 that are designed according to IEEE-1394. The DVD player 1 transmits digital data obtained by reproducing picture and/or music contents as a transmission source that is recorded on a DVD 8, to the display 2 and recorder 3 via the bus 7. The digital data thus received is recorded on a DVD 9 on the receiver side, so long as copying of the digital data is permitted.

Before reproducing the contents recorded on the DVD 8, the player 1 executes a mutual authentication routine or operation for confirming, between the player 1 and the display 2 or recorder 3, whether each of these apparatuses is able to operate according to the intention of the producer or creator who produced or created the contents recorded on the DVD 8. For example, the display 2 does not have a recording function, and therefore complete authentication using a public key is established between the display 2 and the player 1. In this case, even if the contents is prohibited from being recorded, the data may be transferred to the display 2, if reproduction of the contents is permitted. Between the player 1 and the recorder 3, limited authentication using a common key is established. In this case, data transfer is possible only with respect to such contents that are allowed to be both recorded and reproduced. Data present on the bus 7 is encrypted or encoded, so as to only admit data transfer between authenticated apparatuses.

The player 1 checks if the DVD 8, to be played back is an authorized medium (i.e., medium containing data that has been recorded under authorization), using three types of information recorded on the DVD 8, namely, CCI (copy control information), watermark (electronic watermark information) and media mark (error information having a particular pattern).

Figure 2:
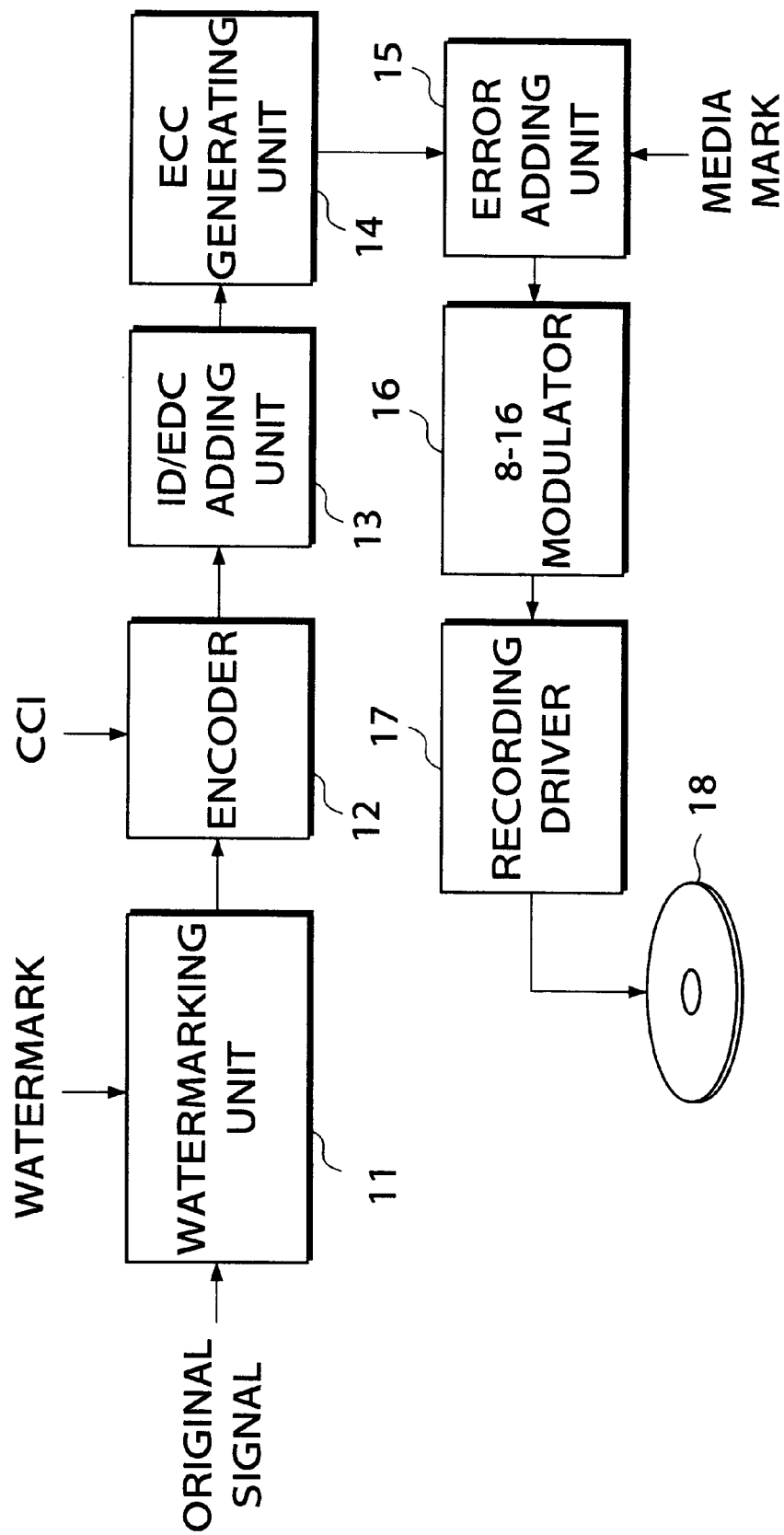
FIG. 2 is a block diagram showing the construction of an original disc producing apparatus to which the present invention is applied.

FIG. 2 shows the construction of an original disc producing apparatus for producing original DVD that is provided with the above items of information.

The apparatus includes a watermarking unit 11 that embeds a watermark into an original signal (original data or digital data) at an unnoticeable or background portion thereof, e.g., at a portion having a large difference in the intensity level that provides a masking effect. The watermark may also be embedded into a particular frequency of a signal obtained through Fourier transformation of the original signal. The signal in which the watermark was embedded is then compressed and encoded by an encoder 12. At any point during the above process, a CCI imprinting means (not illustrated) incorporated in the apparatus adds a two-bit CCI that reflects the intention of the producer, to the signal. In the present embodiment, the encoder 12 serves as the CCI imprinting means for adding the CCI to the signal. In the next stage, an ID/EDC (Identifier/Error Detecting Code) adding unit 13 adds an ID and an error detecting code to the signal received from the encoder 12, and an ECC (Error Correction Code) generating unit 14 then generates an error correction code based on main data of the original signal, and adds the error correction code to the main data. The data provided with the error correction code is able to tolerate about 1% reading error, for example. In the next stage, error adding means 15 adds error information having a particular pattern, as a media mark, to a portion of the original signal or original data other than the main data provided with the error correction code, such that the error information (media mark) does not exceed the above error rate. Namely, a bit error is deliberately introduced into the data to provide a media mark. The media mark may be a certain pattern plotted on the time axis or a certain pattern on the frequency axis. The data provided with the media mark is then modulated by an EFM (Eight-to-Fourteen Modulation) modulator 16 from 8, to 16 (DVD) or from 8, to 14 (CD), and recorded by a recording driver 17 on an original disc 18. DVDs produced from the original disc 18 are those of original version.

Figure 3:
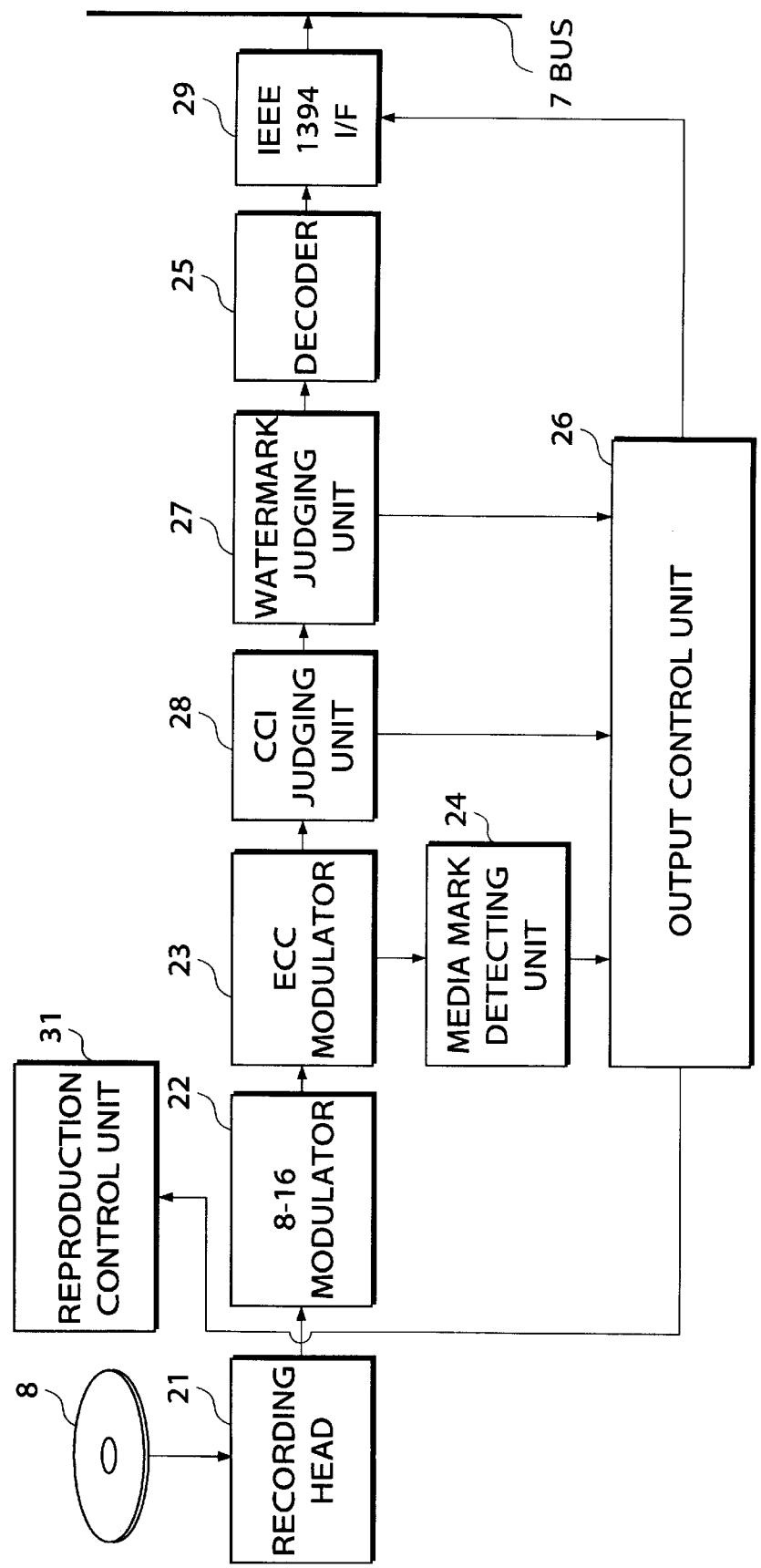
FIG. 3 is a block diagram showing in detail the construction of a player of the system of FIG. 1.

FIG. 3 shows details of the construction of the player 1 of FIG. 1.

The player 1 includes a reading head 1 that reads out data recorded on the DVD 8, an EFM demodulator 22 that demodulates the data read by the reading head 1, and an ECC demodulator 23 that extracts the error correction code from the data demodulated by the EFM demodulator 22) so as to perform error correction processing on the data. In the error correction processing, the ECC demodulator 23 extracts the error correction code from the data read and modulated in the previous stages, and detects and corrects any errors of the data based on the extracted error correction code. A media mark detecting unit 24 obtains the trend of a pattern of each error detected by the ECC modulator 23 through a correlation operation, or the like, and determines that a media mark is present in the data read and modulated in the previous stages if it detects an error occurring in a predetermined, particular pattern. The output of the media mark detecting unit 24 is supplied to an output control unit 26. The data demodulated by the ECC modulator 23 is then supplied to a decoder 25 via a CCI judging unit 28 and a watermark judging unit 27. The watermark judging unit 27 and CCI judging unit 28 makes judgments or decisions on a watermark and a CCI, respectively, that are extracted from the demodulated data, and outputs the results of judgments to the output control unit 26. These judgments may be made before or after signal decoding, rather than during decoding, depending upon the method of recording the watermark and others. Where the output control unit 26 determines that data transfer is allowable or permissible, based on the output of the media mark detecting unit 24 and the results of judgments made by the watermark judging unit 27 and CCI judging unit 28, the control unit 26 controls the decoder 25 so that main data to be transmitted, which contains the watermark and CCI, is supplied from the decoder 25 to an interface (I/F) 29. Where reproduction of the player 1 is prohibited, the output control unit 26 controls a reproduction control unit 31 as needed. Where the data is supplied to the I/F 29, the main data to be transmitted is converted into a bit stream having a fixed bit rate according to IEEE-1394, and then output onto the bus 7.

FIG. 4 shows the construction of the recorder 3 of FIG. 1. While the recorder 3 shown in FIG. 4 is in the form of a DVD recorder, by way of example, the recorder 3 may be another type of digital recording apparatus, such as a digital VCR.

The recorder 3 includes a watermark/CCI detecting unit 41 that receives digital data through the interface 6, and detects a watermark that was embedded in a portion of the digital data where picture and/or voice signals are not apparent or noticeable, e.g., in a portion having a large difference in the intensity level that provides a masking effect, as well as a CCI embedded in a portion of the digital data containing no picture and/or voice signals. The watermark may also be embedded into a particular frequency of a signal resulting from Fourier transformation of the original signal. The recorder 3 further includes an encoder 42 adapted for compressing and encoding the received data, and a control unit 43 that permits or inhibits encoding, depending upon the presence and content of the watermark detected by the watermark/CCI detecting unit 41. Where encoding is permitted, the data is encoded within the encoder 42 and at the same time a CCI is set or changed under control of the control unit 43. In the next stage, an ID/EDC (Identification/Error Detecting Code) adding unit 44 adds an ID and an error detection code to the data received from the encoder 42, and then an ECC (Error Correction Code) generating unit 45 generates an error correction code based on the data received from the ID/EDC adding unit 44, and adds the error correction code to the data. The data provided with the error correction code is then modulated from 8, to 16 (DVD) or from 8, to 14 (CD) by an EFM (Eight-to-Fourteen) modulator 46, and then recorded by a recording driver 47 on a disc (DVD) 48.

Where main data is transmitted to the recorder 3, which indicates that copying of the data is permitted, the recorder 3 performs digital copying of the received data, or, where copying is only allowed under certain restrictions in the presence of the watermark and CCI contained in the main data, the copy restriction level of the CCI is raised or rewritten into a higher level at the same time that copying is carried out.

Table given below shows the possibility/impossibility of reproduction and recording, in relation to the presence and content of the media mark, watermark and CCI that are judged by the output control unit 26.

Since the media mark is not contained in main data to be transmitted, as described above, no media mark is present in a copy disc. Also, no media mark is contained in an old or conventional type of DVDs and CDs. Accordingly, discs in which media marks are present may be judged as original discs, and discs in which no media marks are present may be judged as copy discs or conventional discs.

The water mark is set to "00" where copying is freely permitted, and set to "11" where copying is to be restricted or prohibited. CCI is set to "00" where copying is freely permitted, set to "10" where copying is to be permitted only once (one-generation copying), and set to "11" where copying is to be prohibited. Since a

TABLE

| Input State | Flag of Input Contents | | Input Source | | | Playback Control | Flag Set upon Reproduction Output | | Reading Control | After Recording | | Note |
|---|---|---|---|---|---|---|---|---|---|---|---|---|
| | Watermark | CCI | System | Legality | Summary | | Watermark | CCI | | Watermark | CCI | |
| Disc with Media Mark | 11 | 11 | new | legal | recoding prohibited | ○ | 11 | 11 | X | — | — | 1* |
| | 11 | 10 | new | legal | one generation copying permitted | ○ | 11 | 10 | ○ | 11 | 11 | 2* |
| | 11 | 00 | new | illegal | unauthorized alteration | X | | | X | — | — | 3* |
| | 00 | 10 | new | illegal | unauthorized alteration | X | | | — | — | — | 4* |
| | 00 | 10 | new | illegal | unauthorized alteration | X | | | — | — | — | 4* |
| | 00 | 00 | new | legal | free copying permitted | ○ | 00 | 00 | ○ | 00 | 00 | 5* |
| | none | 11 | new | illegal | unauthorized alteration | X | | | — | — | — | 6* |
| | none | 10 | new | illegal | unauthorized alteration | X | | | — | — | — | 6* |
| | none | 00 | new | illegal | unauthorized alteration | X | | | — | — | — | 6* |
| | 11 | 11 | new | legal | copying of disc for which one generation copying is permitted | ○ | 11 | 11 | — | — | — | 7* |
| Disc without Media Mark = Digital Input | 11 | 10 | new | illegal | unauthorized alteration | X | | | X | — | — | 8* |
| | 11 | 00 | new | illegal | unauthorized alteration | X | | | X | — | — | 8* |
| | 00 | 11 | new | illegal | unauthorized alteration | X | | | X | — | — | 9* |
| | 00 | 10 | new | illegal | unauthorized alteration | X | | | X | — | — | 9* |
| | 00 | 00 | new | legal | copying of disc for which free copying is permitted | ○ | 00 | 00 | ○ | 00 | 00 | 10* |
| Disc without Media Mark = Digital Input | none | 11 | old | legal | copying prohibited | ○ | none | 11 | X | none | 11 | 11* |
| | none | 10 | old | legal | one generation copying permitted | ○ | none | 10 | ○ | none | 11 | 12* |
| | none | 00 | old or personally produced disc | legal | free copying is permitted | ○ | none | 00 | ○ | none | 00 | 12* |
| Analog Input | 11 | — | new | legal | copying prohibited | ○ | 11 | 11** | X | — | — | 13* |
| | 00 | — | new | legal | free copying permitted | ○ | | 00** | ○ | 00 | 00 | 13* |

TABLE-continued

| Input State | Flag of Input Contents | | | Input Source | | | Playback Control | Flag Set upon Reproduction Output | | | Reading Control | After Recording | | | Note |
|---|---|---|---|---|---|---|---|---|---|---|---|---|---|---|---|
| | Watermark | CCI | System | Legality | Summary | | | Watermark | CCI | | | Watermark | CCI | | |
| Broadcast | none | — | old generation or personally produced disc | legal + illegal (old disc) | one generation copying permitted | | ○ | none | 10** | | ○ | none | 11 | | 14* |
| Waves | 11 | 11 | new system | legal | copying prohibited | | ○ | 11 | 11 | | X | — | — | | 15* |
| | 11 | 10 | new system | legal | one generation copying permitted | | ○ | 11 | 10 | | ○ | 11 | 11 | | 15* |
| | 00 | 00 | new system | legal | free copying permitted | | ○ | 00 | 00 | | ○ | 00 | 00 | | 15* |
| | none | 11 | current system | legal | copying prohibited | | ○ | none | 11 | | X | — | — | | 15* |
| | none | 10 | current system | legal | one generation copying permitted | | ○ | none | 10 | | ○ | none | 11 | | 15* |
| | none | 00 | current system | legal | free copying permitted | | ○ | none | 00 | | ○ | none | 10 | | 15* |

"11", "00*", "10**" are treated as "11", "00" and "10", respectively.

Notes:
1* Authorized disc from which recording is prohibited.
2* Authorized, original disc for which one-generation copying is permitted
3* Disc subjected to unauthorized alteration, which cannot be played back on a new system
4* Not included among appropriate combinations
5* Original disc permitting free copying
6* Meaningless combination (alteration)
7* Recorded disc having contents for which one-generation copying is permitted: this may be unauthorized copy disc
8* Unauthorized copy disc
9* Meaningless combination (alteration)
10* Copy disc with contents copied from a disc that permits free copying
11* Conventional disc that is weakly protected against unauthorized use or copying (using only CCI)
12* Conventional disc that is weakly protected against unauthorized use or copying
13* Copy control may be performed on analog signal
14* Only one-generation copying is permitted (equivalent to SCMS)
15* Basically, no inappropriate signal is generated.

disc containing no watermark is regarded as a conventional disc, an inconsistency arises if no watermark is present and a media mark is present. In this case, therefore, the disc is judged as invalid (unauthorized) one regardless of the pattern of CCI. Where no media mark nor watermark is present, it indicates that the disc in question is a conventional one, and therefore free copying is permitted if CCI is "00", copying is allowed only one time if CCI is "10", and only reproduction is allowed if CCI is "11".

Where both watermark and CCI are "00", free copying is permitted, and therefore recording and reproduction of the data are allowed regardless of the presence of a media mark. Where the watermark is "00" and CCI is "10" or "11", however, an inconsistency arises, and the disc in question is considered as unauthorized one on which bit handling or bit manipulation was deliberately or intentionally conducted.

Where the watermark is "11", which indicates that copying is only permitted under some restrictions, CCI is supposed to be "10" or "11". If CCI is "00", therefore, the disc is considered and handled as unauthorized one. If CCI is "10", which permits only one-time copying, the disc should be an original disc, and thus regarded as valid one only when a media mark is present. If no media mark is present, the disc in question is judged as unauthorized one for which the CCI has been intentionally rewritten or changed. Where CCI is "11", copying is prohibited, and thus only reproduction is allowed.

Since no reproduction nor recording is permitted where the DVD 8, is judged as unauthorized one, the player 1 does not transmit main data to either of the display 2 and recorder 3. Where the disc is judged as only permitting reproduction, main data is transmitted to the display 2 and the recorder 3, but the recorder 3 that is constructed to be authenticated by the player 1 does not perform a recording operation since the CCI contained in the relevant data permits only reproduction.

The control scheme relating to the possibility/impossibility of reproduction and recording as described above is not limitedly applied to the digital data transmission system as illustrated above in the present embodiment, but may also be suitably applied to a system of digital reproduction/recording apparatuses that employ data transmission using conventionally existing analog signals. For example, as shown in Table, where an analog input signal is used as an input source, a watermark may be introduced into the signal. In this case, the analog input signal may be processed in a similar manner to the present invention if the input signal is considered as containing no media mark, and a CCI corresponding to the watermark. When receiving digital broadcasting waves as an input source, the system assumes that a media mark is present, due to the fact that it can actually receive the registered digital broadcasting waves. In such a case, a watermark and CCI may be added to the input data without any problem, and thus the input data may be processed in the same manner as in the present invention.

In this case, when a digital signal is received, copying is controlled by checking the watermark and CCI contained in the received digital signal, as shown in TABLE above. Where a watermark is present, copying is prohibited if both the watermark and CCI are "11", and copying is freely permitted if both the watermark and CCI are "00", and the received digital signal copied with the watermark and CCI both being "00". Since only one-generation copying is permitted when the watermark is "11" and CCI is "10", the received digital signal is copied in a form containing the watermark while changing CCI into "11", and thus recorded with the watermark and CCI being "11".

In the digital data transmission system as previously explained, a plurality of digital apparatuses are connected to each other via a bus, and authenticating operations are performed between these digital apparatuses so that digital data is transmitted and received only between these authenticated apparatuses through their interfaces. Such a digital data transmission system, however, is able to output reproduced contents of voice and/or picture information in the form of analog signals if the contents is recorded on an authorized medium, thus giving rise to a possibility that the analog output may be digitally recorded again on another recording medium, using a non-authenticated or illegal apparatus other than the authenticated apparatuses. Such a recording medium is unavoidably recognized as a medium of a conventional system having no watermark or media mark. If the CCI recorded on the medium allows free copying or one-generation copying, and this medium is brought again into the system of the authenticated apparatuses, reproduction of the contents recorded on the medium is naturally possible, and, in addition, another copy medium may be produced by the system of the authenticated apparatuses, based on the CCI permitting one-generation copying. Thus, there is a possibility that an authorized medium is produced from an unauthorized medium. Needless to say, it is impossible to prohibit generation of analog signals altogether, and it is also practically impossible to perform encryption (encoding) on analog outputs, or incorporate cryptanalytic circuits in all of reproduction-side apparatuses, for example, picture display apparatuses available all over the world.

In order to prevent authenticated apparatuses from reproducing the contents of unauthorized media produced using non-authenticated apparatuses as described above, the authenticated apparatuses may be constructed so as to perform recording and/or reproducing operations utilizing electronic authentication signature data that can be recognized only among the authenticated apparatuses. With this arrangement, the authenticated apparatuses in the system are able to check if data stored in the medium in question was legally recorded or copied in the system of the authenticated apparatuses, and thus able to control execution of reproducing and/or recording operations. Thus, even if any one of the authenticated apparatuses in the system attempts to reproduce data that was illegally or improperly recorded in a medium using a non-authenticated apparatus, no electronic authentication signature is present which should be confirmed between the authenticated apparatuses, or a negative decision is obtained as a result of authentication of the electronic signature. In this case, the authenticated apparatus does not perform a reproducing operation, thereby avoiding the use of the unauthorized medium.

While various data encryption methods may be utilized to enable production/authentication of electronic authentication signatures, a public-key encryption method, as one example of data encryption methods, will be explained herein. According to RSA (Rivest, Shamir, Adleman) encryption as a typical example of public-key encryption methods, the basis of the safety resides in the difficulty in factoring of a large number with prime factors, and encrypting/decrypting operations are performed through calculation of exponential residues. The encrypting procedure is represented by "C=E(M)=(the e-th power of M) residue n", and the decrypting procedure is represented by "M=D(C)=(the d-th power of C) residue n". Here, "M" means plaintext, and "C" means ciphertext, while encrypting keys are "e" and "n", and decrypting keys are "d" and "n". The encrypting key "e" and common key "n" are made public, and the decrypting key "d" is kept secret. The keys "e", "d", "n" are determined in the following manner: (1) arbitrarily choosing two large prime factors "p", "q", and setting "n" to be equal to the product of "p" and q (n=pq), (2) calculating the least common multiple "L" of (p−1) and (q−1), and obtain a certain integer "e" that has no common factor with "L" and smaller than "L", and (3) obtaining "d" that satisfies ed=1 residue L. The values of "e", "d" and "n" selected in this manner establish the relationship "(the ed-th power of M) residue n=M" with respect to all the plaintext M. A decipherer must know the decrypting key "d" in order to decrypt or decipher the ciphertext C. To this end, the decipherer needs to know the secret prime factors "p" and "q", and compute "d=the −1st power of e residue L" from the minimum least multiple "L" of (p−1) and (q−1) and the public key "e", to thus obtain the secret key "d". Since the public key "n" is the product of prime factors "p" and "q", encryption cannot be achieved if the public key "n" is such an integer that can be easily factored into prime factors. In view of this, each of "p" and "q" is normally set to a value of about one-hundred figures (in the decimal system), and the public key "n" is normally set to a value of about two-hundred figures. With "p", "q" and "n" set to these values, it would take several millions of years to accomplish prime factoring even with an electronic calculator of 1000 MIPS, thus making it practically impossible to decrypt the ciphertext.

The operation of the system of the authenticated apparatuses will be now described. Initially, a common key "n" is stored in each of the authenticated apparatuses in the system. When each of these apparatuses writes data contents to be recorded, into a recording medium, the apparatus uses the encrypting key "e" which is made public to encrypt a content as a combination of the self identification ID for identifying the apparatus and a characteristic ID of the contents to be recorded, to produce data of electronic authentication signature, and records the signature data, as well as the data contents, in the recording medium. Where any one of the authenticated apparatuses in the system receives the medium to reproduce the contents recorded on the medium, the contents are decrypted using the common key and non-public (secret) decrypting key, and reproduced only when the apparatus ID and data contents ID are confirmed and the medium is considered as authorized one. If the data stored on the medium was recorded by a non-authenticated apparatus, no data of electronic authentication signature is present, or the data cannot be decrypted (or the data was not encrypted in a particular method common to the authenticated apparatuses). In this case, the recording medium in question cannot be recognized as authorized one, and the data contents in the medium will not be reproduced.

What is claimed is:

1. A digital copy control method of controlling copying of digital data from a digital recording medium, which digital data is transmitted from a transmitter-side apparatus to a receiver-side apparatus through interfaces thereof in a system of a plurality of digital apparatuses that are connected to each other through a bus and mutually authenticated, said interfaces permitting transmission and receiving of the digital data only between the authenticated apparatuses, the digital copying control method restricting reproducing and recording operations of the transmitter-side apparatus and the receiver-side apparatus based on copy control information contained in the digital data for restricting copying of the data so as to prevent unauthorized copying, comprising the steps of:

adding the copy control information indicating a copy restriction level, to main data of the digital data recorded on the digital recording medium such that said main data contains a first portion containing at least one of picture information and voice information, and a second portion containing the copy control information;

adding electronic watermark information to said second portion of the main data containing said at least one of picture information and voice information;

adding an error correction code to the main data, and then adding intentional error information having a particular pattern to the digital data;

determining whether the digital recording medium from which the digital data is to be reproduced and transmitted from the transmitter-side apparatus is authorized one or not, based on the copy control information, the electronic watermark, and the error information having the particular pattern; and restricting the reproducing and recording operations of the transmitter-side apparatus and the receiver-side apparatus with respect to the digital data in the digital recording medium, depending upon whether the digital recording medium is authorized one or not.

2. A digital recording medium in which digital data including main data is recorded for reproduction or recording on another recording medium, wherein said main data includes a first portion comprising at least one of picture and voice information, and a second portion comprising copy control information indicating a copy restriction level, said copy control information being rewritten upon digital copying of the main data so that the copy restriction level is raised to a higher level, said main data further including electronic watermark information that is added to said first portion of the main data comprising said at least one of picture and voice information, said electronic watermark information being unable to be rewritten upon digital copying of the main data;

wherein a medium mark is added to a portion of the digital data in which the main data is not recorded, such that the medium mark is not read by an external device;

wherein reproduction and digital copying of the main data are controlled in accordance with an intention of a producer of the main data, based on a combination of contents of the copy control information, electronic watermark information, and the medium mark.

3. An apparatus for producing a digital recording medium, comprising:

a watermark information adding device that adds electronic watermark information to original data so as not to affect characteristics of the original data;

a copy control information adding device that adds copy control information to the original data, said copy control information being provided for restricting digital copying of the original data;

an error correction code generating device that generates an error correction code based on main data of the original data to which the electronic watermark information and the copy control information have been added, and adding the error correction code to the original data; and an error information adding device that adds error information having a particular pattern, as medium mark, to the original data to which the error correction code has been added by said error correction code generating apparatus.

4. A digital reproduction apparatus usable as a transmitter-side apparatus in a system comprising a plurality of digital apparatuses that are connected to each other via a bus and mutually authenticated, said system being constructed to transmit digital data from the transmitter-side apparatus of the digital apparatuses to a receiver-side apparatus thereof through respective interfaces that permit transmission and receiving of the digital data between the authenticated apparatuses, comprising:

a reading device that reads out recorded data from a digital recording medium;

an error detecting/correcting device that extracts an error correction code from the recorded data read by said reading device, and detects and corrects an error in the recorded data read out by said reading device, based on the extracted error correction code;

a particular pattern error detecting device that detects whether the error detected by said error detecting/correcting device has a particular pattern or not;

an output device that generates the recorded data whose error has been corrected by said error detecting/correcting device, in a form of digital information that matches specifications of the interfaces;

a copy control information judging device that extracts and makes a judgment on copy control information contained in the recorded data whose error has been corrected, said copy control information being provided for restricting digital copying of the data;

an electronic watermark information judging device that extracts electronic watermark information indicating a copy restriction level, from the recorded data whose error has been corrected, and makes a judgment on the electronic watermark information; and an output control device that determines whether the digital recording medium is an original medium or a copy medium, based on a result of detection of said particular pattern error detecting device, and permits or prohibits reproduction of the recorded data by the digital reproduction apparatus as the transmitter-side apparatus, based on a result of determination by the output control device and results of judgments made by said copy control information judging device and said electronic watermark information judging device.

5. A digital reproduction apparatus according to claim 4, wherein said copy control information judging device determines one of three copy restriction levels from the copy control information, said three copy restriction levels indicating permission of free copying, permission of one-generation copying, and prohibition of copying, respectively;

wherein said electronic watermark information judgment device determines one of two copy restriction levels from the electronic watermark information, said two copy restriction levels indicating permission of free copying and prohibition of copying; and wherein said output control device determines whether the digital recording medium contains data that was recorded with permission, based on results of determinations of said copy control information judging device and said electronic watermark information judging device, and a result of detection of said particular pattern error detecting device, and allows the digital reproduction apparatus to reproduce the data recorded in the digital recording medium if the data was recorded in the medium with permission.

6. A digital reproduction apparatus according to claim 5, wherein said output control device allows the digital reproduction apparatus to reproduce the data recorded in the digital recording medium, if the error having a particular pattern is detected by said particular pattern error detecting device, and the copy restriction level determined by said copy control information judging device indicates permission of one-generation copying, while at the same time the copy restriction level determined by said electronic water information judging device indicates prohibition of copying.

7. A digital reproduction apparatus according to claim 4, wherein said output control device inhibits the digital reproduction apparatus from reproducing the data recorded in the digital recording medium, if the error having a particular pattern is detected by said particular pattern error detecting device, and contradictory results are obtained from said copy control information judging device and said electronic watermark information judging device except the case where the copy restriction level determined by said copy control information judging device indicates permission of one-generation copying, and the copy restriction level determined by said electronic watermark information judging device indicates prohibition of copying.

8. A digital reproduction apparatus according to claim 5, wherein said output control device inhibits the digital reproduction apparatus from reproducing the data recorded in the digital recording medium, if the error having a particular pattern is detected by said particular pattern error detecting device, and contradictory results are obtained from said copy control information judging device and said electronic watermark information judging device except the case where the copy restriction level determined by said copy control information judging device indicates permission of one-generation copying, and the copy restriction level determined by said electronic watermark information judging device indicates prohibition of copying.

9. A digital reproduction apparatus according to claim 4, wherein said output control device inhibits the digital reproduction apparatus from reproducing the data recorded in the digital recording medium, if the error having a particular pattern is detected by said particular pattern error detecting device, and no electronic watermark information is detected by said electronic watermark judging device.

10. A digital reproduction apparatus according to claim 5, wherein said output control device inhibits the digital reproduction apparatus from reproducing the data recorded in the digital recording medium, if the error having a particular pattern is detected by said particular pattern error detecting device, and no electronic watermark information is detected by said electronic watermark judging device.

11. A digital reproduction apparatus according to claim 4, wherein said output control device inhibits the digital reproduction apparatus from reproducing the data recorded in the digital recording medium, if no error having a particular pattern is detected by said particular pattern error detecting device, and a result of determination of said copy control information judging device is different from a result of determination of said electronic watermark information judging device.

12. A digital reproduction apparatus according to claim 5, wherein said output control device inhibits the digital reproduction apparatus from reproducing the data recorded in the digital recording medium, if no error having a particular pattern is detected by said particular pattern error detecting device, and a result of determination of said copy control information judging device is different from a result of determination of said electronic watermark information judging device.

13. A digital recording apparatus usable as a receiver-side apparatus in a system comprising a plurality of digital apparatuses that are connected to each other via a bus and mutually authenticated, said system being constructed to transmit digital data from a transmitter-side apparatus of the digital apparatuses to the receiver-side apparatus through respective interfaces that permit transmission and receiving of the digital data between the authenticated apparatuses, comprising:

a receiving device that receives digital data that includes a first portion comprising at least one of picture and voice information, and a second portion comprising copy control information having one of copy restriction levels indicating permission of free copying, permission of one-generation copying and prohibition of copying, said digital data further including electronic watermark information that is added to said first portion of the digital data comprising said at least one of picture and voice information; and a recording control device that determines the copy restriction levels of the copy control information and electronic watermark information of the digital data, and controls said digital recording apparatus such that wherein, when the determined copy restriction level of the copy control information indicates permission of one-generation copying and the determined copy restriction level of the electronic watermark information indicates prohibition of copying, said digital recording apparatus records the electronic watermark information as it is, and records the copy control information with the copy restriction level thereof being rewritten into one indicating prohibition of copying.

14. A digital copy control method according to claim 1, wherein the authenticated digital apparatuses include at least one apparatus that is constructed to be able to output contents of digital data recorded on the digital recording medium, as an analog signal, without passing through said interfaces, and at least one apparatus that is constructed to be able to record the contents of digital data received as the analog signal, into a new digital recording medium, without passing through said interfaces, all of said authenticated digital apparatuses being constructed such that when data contents supplied in a form of an analog signal or a digital signal is digitally recorded onto the digital recording medium, electronic authentication signature data that can be recognized only between the authenticated apparatuses are recorded in addition to the data contents, onto the digital recording medium, said method further comprising the steps of:

detecting presence of the electronic authentication signature data that can be recognized only between the authenticated digital apparatuses, when reproducing the contents of digital data recorded in the digital recording medium; and permitting reproduction of the contents of digital data in the digital recording medium only when the electronic authentication signature data is present.

15. A digital recording medium according to claim 2, on which is further recorded electronic authentication signature data that can be recognized only between the authenticated digital apparatuses.

16. A digital reproducing apparatus according to claim 4, further comprising a detecting device that detects electronic authentication signature data that can be recognized only between the authenticated digital apparatuses, and wherein said output control device inhibits the digital reproducing apparatus from reproducing the recorded data when the electronic authentication signature data is not detected by said detecting device.

17. A digital recording apparatus according to claim 13, wherein the authenticated digital apparatuses include at least one apparatus that is constructed to be able to output contents of digital data recorded on the digital recording medium, as an analog signal, without passing through said interfaces, and wherein said recording control device records electronic authentication signature data that can be recognized only between the authenticated digital apparatuses, in addition to the contents of digital data, onto the digital recording medium, when digitally recording the contents of digital data supplied in a form of the analog signal, onto the digital recording medium.

* * * * *